(12) United States Patent
Hachenberg et al.

(10) Patent No.: US 7,005,175 B2
(45) Date of Patent: Feb. 28, 2006

(54) VENTILATED DOUBLE-WALLED COMPOSITE AIRCRAFT FUSELAGE SHELL

(75) Inventors: Dieter Hachenberg, Hamburg (DE); Christian Rueckert, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/287,463

(22) Filed: Nov. 4, 2002

(65) Prior Publication Data

US 2003/0087049 A1 May 8, 2003

(30) Foreign Application Priority Data

Nov. 2, 2001 (DE) ................... 101 54 063

(51) Int. Cl.
*B32B 1/04* (2006.01)
*B32B 3/02* (2006.01)
*B64C 1/00* (2006.01)

(52) U.S. Cl. .............. 428/75; 428/68; 428/76; 428/212; 244/119; 244/120

(58) Field of Classification Search .......... 428/34.1, 428/73, 75, 68, 71, 74, 76, 212; 244/119, 244/120

See application file for complete search history.

(56) References Cited

U.S. PATENT DOCUMENTS

| | | | | |
|---|---|---|---|---|
| 3,567,162 A | * | 3/1971 | Lea .............. | 244/121 |
| 4,557,961 A | * | 12/1985 | Gorges .......... | 428/117 |
| 4,943,472 A | * | 7/1990 | Dyksterhouse et al. ..... | 442/417 |
| 5,240,527 A | | 8/1993 | Lostak et al. | |
| 5,398,889 A | | 3/1995 | White et al. | |
| 5,472,760 A | | 12/1995 | Norvell | |
| 5,580,502 A | * | 12/1996 | Forster et al. ............. | 264/46.5 |
| 5,806,796 A | * | 9/1998 | Healey ............... | 244/117 R |
| 5,811,167 A | | 9/1998 | Norvell | |
| 5,849,234 A | * | 12/1998 | Harrison et al. ........... | 264/257 |
| 6,065,717 A | * | 5/2000 | Boock ............. | 244/1 N |
| 6,114,050 A | * | 9/2000 | Westre et al. ............. | 428/608 |
| 6,415,621 B1 | * | 7/2002 | Buchholz et al. ........... | 62/402 |
| 6,460,240 B1 | * | 10/2002 | Kielies et al. .............. | 29/469.5 |
| 6,612,217 B1 | * | 9/2003 | Shockey et al. ............ | 89/36.11 |

FOREIGN PATENT DOCUMENTS

| | | |
|---|---|---|
| DE | 44 17 889 | 11/1995 |
| DE | 298 16 091 | 5/1999 |
| EP | 0 849 164 | 6/1998 |
| WO | WO02/098644 | 12/2002 |

* cited by examiner

*Primary Examiner*—Harold Pyon
*Assistant Examiner*—Patricia L. Nordmeyer
(74) *Attorney, Agent, or Firm*—W. F. Fasse; W. G. Fasse

(57) ABSTRACT

An aircraft fuselage shell is fabricated of a double-walled composite structural component, including a core element bonded and sandwiched between an inner cover layer and an outer cover layer. The inner cover layer forms the main load bearing fuselage inner skin, and the outer cover layer forms the fuselage outer skin which carries a smaller proportion of the loads. The core element may consist of fiber-reinforced composite material while the cover layers may consist of an aluminum alloy, another metal, or fiber-reinforced composite material. The core element is air permeable and has air flow channels extending longitudinally therethrough in at least one direction. The cover layers do not seal or enclose the core element, so the core element is ventilatable. A ventilating airflow carries moisture as water vapor out of the core element, and then the moisture is condensed and removed by a moisture management unit.

16 Claims, 1 Drawing Sheet

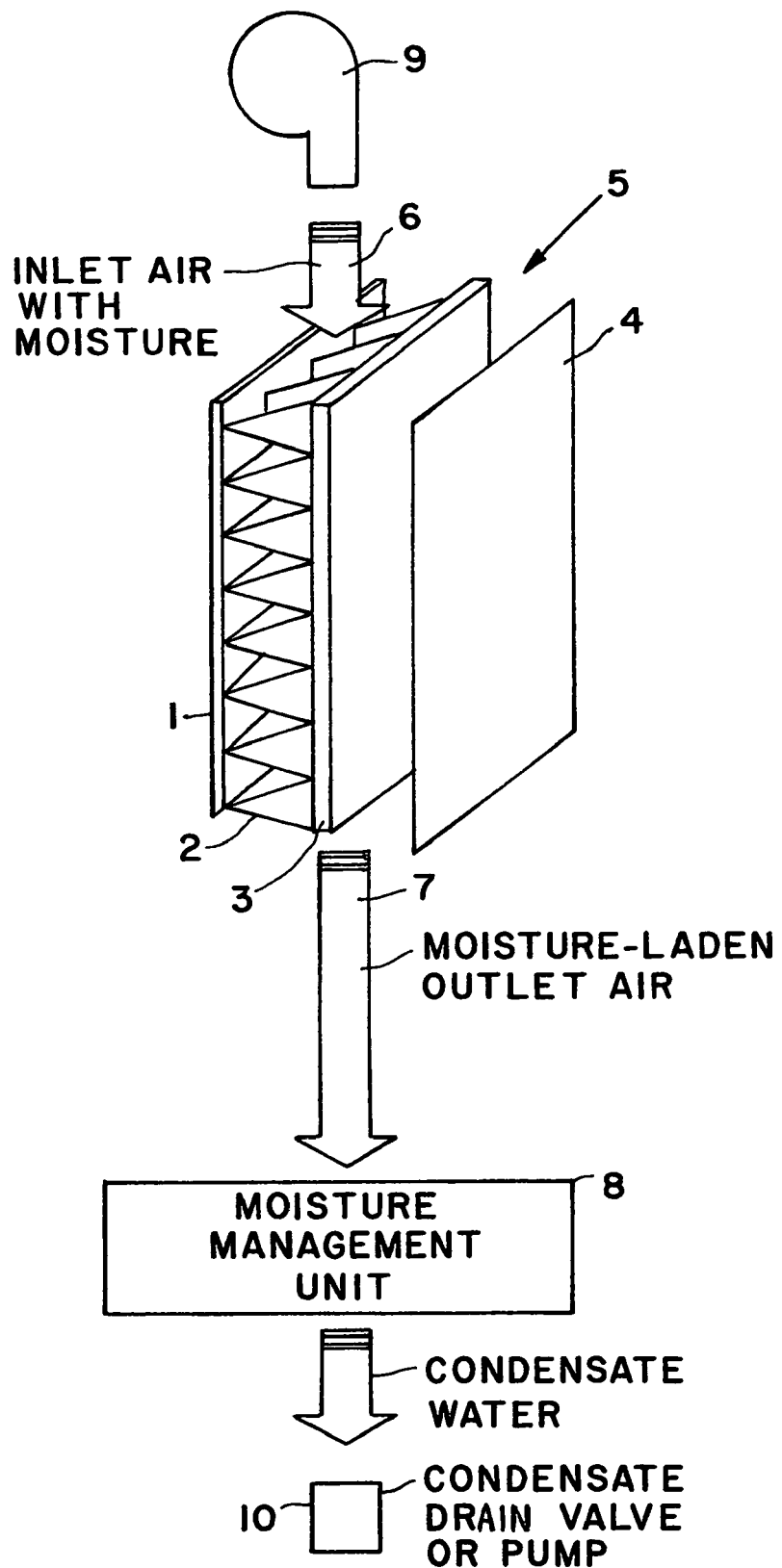

VENTILATED DOUBLE-WALLED COMPOSITE AIRCRAFT FUSELAGE SHELL

PRIORITY CLAIM

This application is based on and claims the priority under 35 U.S.C. §119 of German Patent Application 101 54 063.9, filed on Nov. 2, 2001, the entire disclosure of which is incorporated herein by reference.

FIELD OF THE INVENTION

The invention relates to a double-walled composite core structural component, preferably comprising a fiber composite material, and including a core element that is sandwiched between two cover layers of aluminum, some other metal, a fiber-reinforced composite material, or the like.

BACKGROUND INFORMATION

The build-up of condensate moisture has long been a problem in an aircraft fuselage wall or shell forming the primary load-bearing wall structure of the aircraft airframe. Due to the moisture released into the air by the passengers' breath and the like and the natural atmospheric humidity in the cabin air in the enclosed aircraft cabin, and due to the cold temperatures prevailing outside of the aircraft during high altitude flight, the moist interior air that permeates into the structure of the aircraft fuselage shell wall reaches components at or below the dew point temperature for this moist air. As a result, the moisture condenses, and the condensate water tends to accumulate in the wall, unless special provisions are made for the removal of this condensate water.

It has been known to use double-walled composite core structures or structural components having a synthetic (e.g. polymeric) core element enclosed in cover layers of aluminum, fiber-reinforced composite material, or the like, for secondary structures in aircraft. An example of such double-walled composite structures are so-called Nomex honeycomb structures. However, such structural components have always only been used as secondary components, and have not been used in the primary structure of the airframe, e.g. the aircraft fuselage shell, of an aircraft, for various reasons. Most importantly, the known double-walled composite structures suffer an undesirable moisture uptake in service, whereby the structures accumulate condensed moisture in the substantially sealed core, after moist cabin air permeates into the core through a cover layer of the structure, or through small gaps or mounting holes or the like. The moisture is then trapped inside the double-walled composite structure. Therefore, such conventional composite structural components are not suitable for use in the primary fuselage shell, due to the accentuated condensation problems as discussed in the preceding paragraph. Also, the known double-walled composite structures are rather susceptible to damage and consequently require repair. For example, the aim has been to maintain the enclosed and sealed condition of the composite core element.

SUMMARY OF THE INVENTION

In view of the above it is an object of the invention to provide a double-walled composite core structure or structural component which avoids the undesirable uptake or trapping of moisture during service thereof, and the high damage and repair susceptibility of prior art structures of this general type. It is a further particular object of the invention to provide such a double-walled composite core structural component that is suitable for use in the primary structure of the airframe and particularly the fuselage shell of an aircraft. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a ventilated double-walled composite structural component forming the primary structure of an aircraft fuselage shell, including an air permeable core element, a first cover layer that forms the main load bearing inner skin of the aircraft fuselage, and a second cover layer forming the secondary or subordinate partial load bearing outer skin of the aircraft fuselage. The core element is bonded and sandwiched between the two cover layers. According to the invention, the core element is not completely enclosed, encased or sealed in an airtight manner, but rather remains open and ventilatable, so that air can flow in at least one flow direction through the air permeable core element between the inner cover layer and the outer cover layer.

According to particular inventive embodiments, the core element may be made of glass fiber reinforced synthetic polymer material, carbon fiber reinforced synthetic polymer material, or phenolic resin impregnated paper. A further important feature is the structure or configuration of the core element so as to maintain the air permeability thereof, to allow air to flow therethrough in at least one direction along the core element between the inner and outer cover layers. For example, the core element is constructed as a folded honeycomb structure, a folded cell structure, or a pleated structure, with open cells or passages thereof oriented locally parallel to or along the major surfacial extent of the composite structure, i.e. along the core element between the inner and outer cover layers, rather than penetrating through the core element locally perpendicular to the cover layers. The core element may, most simply, comprise zig-zag folds or pleats forming longitudinally extending air flow channels.

Preferably, an airflow is positively forced or blown through the airflow channels of the air permeable core element, for example by a blower, which may simply blow cabin air or cool dry air-conditioned air through the core element. This flow of air through the core element carries excess moisture (in the form of water vapor) out of the core element into a moisture management system, for example including cold condensing elements or other means of dehumidification, to condense the excess moisture out of the air, and then drain or pump the collected condensate water out of the aircraft. Thereby, it is an essential and substantial advantage of the invention that the core element is not sealed or enclosed, but rather is purposely ventilated, so as to actively remove moisture out of the core element and prevent the accumulation of moisture therein. Thereby, for the first time, it becomes possible to use such a composite structure in the primary structure of the aircraft fuselage shell. Further advantages of the invention include an improvement of the acoustic and thermal insulation properties and an increase in the full scale fire protection against total fire penetration or fire destruction of the component, in comparison to the prior art.

BRIEF DESCRIPTION OF THE DRAWINGS

In order that the invention may be clearly understood, it will now be described in connection with an example embodiment, with reference to the accompanying single drawing FIGURE, which schematically shows a sectioned and partially exploded perspective view of a small portion of a double-walled composite structural component as an aircraft fuselage shell wall according to the invention.

DETAILED DESCRIPTION OF A PREFERRED EXAMPLE EMBODIMENT AND OF THE BEST MODE OF THE INVENTION

As shown schematically in the single drawing FIGURE, the double-walled composite core structural component 5 according to the invention comprises two cover layers 1 and 3 consisting of fiber-reinforced composite synthetic material, for example. The cover layers 1 and 3 may alternatively consist of an aluminum alloy, or some other metal. One cover layer 1 forms the outer skin and the other cover layer 3 forms the inner skin of an aircraft fuselage shell. The inner cover layer 3 forming the inner skin of the aircraft fuselage shell carries the major loads, i.e. the majority of the total load to be carried by the fuselage shell during service. On the other hand, the outer cover layer 1 carries a relatively smaller proportion of the loads, e.g. of the active loads arising during operation. For schematic simplicity, the composite core structural component 5 is shown as substantially flat or planar, but in actual practice the composite structural component 5 may have a curved configuration, e.g. the typical curved configuration of an aircraft fuselage shell.

The double-walled composite core structure or structural component 5 further comprises a core element 2 that is bonded and sandwiched between the two cover layers 1 and 3. The core element 2 is air permeable, and is not completely enclosed, encapsulated, or sealed, but rather is ventilatable. Particularly, the structure of the core element 2 forms air flow channels extending therethrough in at least one longitudinal direction, e.g. locally parallel to the cover layers 1 and 3. An exemplary air inlet flow 6, and a corresponding exemplary air outlet flow 7 are schematically shown by arrows in the FIGURE. This airflow may be passive, e.g. convectively driven, or may be actively and positively driven, e.g. by a blower 9, which may simply blow the internal cabin air, or air-conditioned air, or dehumidified air, through the core element 2, as indicated by the inlet flow 6 and the outlet flow 7.

The composite structural component 5 still further may comprise a decorative cover film or cover material layer 4, which is secured or bonded on the inner surface of the inner cover layer 3 to form the finished, visibly exposed, decorative interior surface of the cabin wall. Thus, the composite structural component 5, especially including the decorative film or cover material layer 4, can provide a complete finished aircraft fuselage shell wall in a very simple, yet structurally strong manner.

While moisture will be carried into the core element 2 by the inlet airflow 6, any excess moisture will also be carried out of the core element 2 by the outlet airflow 7. The water vapor in the outlet airflow 7 is then condensed out of the airflow in a moisture management unit 8 connected to the outlet side of the core element 2. The moisture management unit 8 may comprise any cold condensing element or conventionally known dehumidification unit. The condensate water is then drained out of a valve, or actively pumped out by a pump, as generally schematically indicated by reference number 10.

The core element 2 may be fabricated of glass fiber-reinforced composite synthetic material, or carbon fiber-reinforced composite synthetic material, or of phenolic resin impregnated paper. Preferably, the composite material of the core element 2 is arranged with a folded honeycomb or cell structure, or a pyramid cell structure, or simply a folded pleat structure, so as to provide the longitudinal throughgoing airflow channels mentioned above.

In addition to the avoidance of water accumulation therein, such a structure of the core element 2 provides several advantages in comparison to a conventional fuselage shell construction. For example, the present inventive fuselage shell construction provides a quasi-continuous load support and load distribution and therefore can achieve a higher strength-to-weight ratio with less significant load concentration points. Also, the inventive wall structure provides improved thermal and acoustic insulation, so that the need for separate or additional thermal and acoustic insulation can be proportionately reduced or eliminated. In this manner also, the temperature distribution through the fuselage shell during high altitude flight shifts the dew point out of the aircraft cabin in such a manner that condensation will not arise, i.e. no condensate water will be formed or accumulate in the composite wall structure. Thus, the moisture entering the composite wall structure will also exit from the wall structure in the form of water vapor and can thereafter be actively and effectively removed by the moisture management unit 8. The inventive composite structure also provides improved absorption of impact energy as well as resistance to full scale fire leading to a complete burn-through or failure of the wall structure.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A primary load-bearing aircraft fuselage structural shell comprising a double-walled primary load-bearing composite structural component that comprises:
   a first cover layer;
   a second cover layer spaced apart from said first cover layer; and
   a composite core element structurally bonded to both of, and sandwiched between, said first and second cover layers;
   wherein said first cover layer forms an inner skin of said fuselage structural shell that is constructed to carry and carries a first portion being less than all of a total load carried by said fuselage structural shell;
   wherein said second cover layer forms an outer skin of said fuselage structural shell that is constructed to carry and carries a a non-zero a second portion of said total load to be carried by said fuselage structural shell, wherein said first portion is greater than said second portion and is more than half of said total load;
   wherein said inner skin is constructed structurally stronger than said outer skin so as to carry said first portion of said total load that is greater than said second portion of said total load carried by said outer skin; and
   wherein said core element is air permeable and ventilatable when bonded to and sandwiched between said cover layers.

2. The aircraft fuselage structural shell according to claim 1, wherein said cover layers consist of a metal.

3. The aircraft fuselage structural shell according to claim 2, wherein said core element consists of a fiber-reinforced composite material.

4. The aircraft fuselage structural shell according to claim 1, wherein said cover layers consist of a first fiber-reinforced composite material.

5. The aircraft fuselage structural shell according to claim 4, wherein said core element consists of a second fiber-reinforced composite material.

6. The aircraft fuselage structural shell according to claim 1, wherein said core element consists of a glass fiber-reinforced synthetic composite material.

7. The aircraft fuselage structural shell according to claim 1, wherein said core element consists of a carbon fiber-reinforced synthetic composite material.

8. The aircraft fuselage structural shell according to claim 1, wherein said core element consists of phenolic resin impregnated paper.

9. The aircraft fuselage structural shell according to claim 1, wherein said core element has a folded honeycomb structure.

10. The aircraft fuselage structural shell according to claim 1, wherein said core element has a folded cell structure.

11. The aircraft fuselage structural shell according a to claim 1, wherein said core element has a longitudinally extending pleat structure.

12. The aircraft fuselage structural shell according to claim 1, wherein said core element has airflow channels extending longitudinally therethrough from an air inlet to an air outlet between said first cover layer and said second cover layer.

13. The aircraft fuselage structural shell according to claim 12, further comprising a blower connected to said air inlet or said air outlet.

14. The aircraft fuselage structural shell according to claim 12, further comprising a moisture management unit including a moisture condensing device connected to said air outlet.

15. The aircraft fuselage structural shell according to claim 1, wherein said first cover layer has a concave curvature, and said second cover layer has a convex curvature.

16. The aircraft fuselage structural shell according to claim 1, further comprising a visually decorative cover material that is arranged on said first cover layer and that is visibly exposed and bounds an interior cabin space within said aircraft fuselage structural shell.

* * * * *

UNITED STATES PATENT AND TRADEMARK OFFICE
CERTIFICATE OF CORRECTION

PATENT NO. : 7,005,175 B2
APPLICATION NO. : 10/287463
DATED : February 28, 2006
INVENTOR(S) : Hachenberg et al.

It is certified that error appears in the above-identified patent and that said Letters Patent is hereby corrected as shown below:

<u>Column 4,</u>
Line 52, after "carries a", delete --a--;
        after "non-zero", delete --a--;

<u>Column 5,</u>
Line 22, after "according", delete --a--.

Signed and Sealed this

Eleventh Day of July, 2006

JON W. DUDAS
*Director of the United States Patent and Trademark Office*